(12) United States Patent
Nandyala et al.

(10) Patent No.: US 12,438,502 B1
(45) Date of Patent: Oct. 7, 2025

(54) THREE-PIN CONNECTOR FOR SOLAR ACCESSORY

(71) Applicant: Amazon Technologies, Inc., Seattle, WA (US)

(72) Inventors: Rajesh Reddy Nandyala, Cambridge (GB); Chuenyi Yin, Whittier, CA (US); Hao-Ren Wang, Yilan County (TW); Ming-Chang Wu, Taipei (TW); Wang-Jie Luo, Taipei (TW); Yung-Hsiang Liu, Taipei (TW)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/208,839

(22) Filed: Jun. 12, 2023

(51) Int. Cl.
*H02S 40/34* (2014.01)
*H01R 13/207* (2006.01)
*H01R 105/00* (2006.01)

(52) U.S. Cl.
CPC ........... *H02S 40/34* (2014.12); *H01R 13/207* (2013.01); *H01R 2105/00* (2013.01)

(58) Field of Classification Search
USPC ....................................................... 439/106
See application file for complete search history.

(56) References Cited

U.S. PATENT DOCUMENTS

| 2004/0147172 | A1* | 7/2004 | Brown | F24S 25/632 439/701 |
| 2006/0196535 | A1* | 9/2006 | Swanson | H01L 31/0516 136/244 |
| 2013/0269746 | A1* | 10/2013 | Ramsey | H02S 40/36 174/84 R |
| 2017/0025993 | A1* | 1/2017 | Kang | H02S 40/32 |
| 2018/0269827 | A1* | 9/2018 | Gong | H02S 40/32 |

FOREIGN PATENT DOCUMENTS

WO    WO-2010054839 A1 *   5/2010  ........... H01R 9/2491

OTHER PUBLICATIONS

Machine translation of WO2010/054839A1 (Year: 2010).*

* cited by examiner

*Primary Examiner* — Ryan S Cannon
(74) *Attorney, Agent, or Firm* — Pierce Atwood LLP

(57) ABSTRACT

A multi-pin power connector for a solar accessory is described. In some examples, the power connector has three pins that can be used for identifying a proper solar accessory for an electronic device. In one particular example, a power connector apparatus includes a connector head that is configured to supply power from a solar device to an electronic device. The connector head includes a first electrical connector that is positioned on a first side of the connector head, a second electrical connector that is positioned on a second side of the connector head, and a third electrical connector that is offset from the first electrical connector and the second electrical connector.

13 Claims, 10 Drawing Sheets

THREE-PIN CONNECTOR FOR SOLAR ACCESSORY

BACKGROUND

Solar panels are often used to supply power to recharge batteries of electronic devices. For example, solar panel accessories are sometimes used with a camera device, such as a video doorbell device or security camera device, to charge one or more batteries of the camera device. Different electronic devices, and even different use cases or location placements for the same device, can result in varying power requirements. Accordingly, specifications of one or more solar panel accessories or devices can be assessed for a particular device in a particular location, e.g. to select a solar panel accessory for a camera device. Such specifications can include parameters such as solar panel efficiency, output voltage, operating temperature range, and other parameters.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
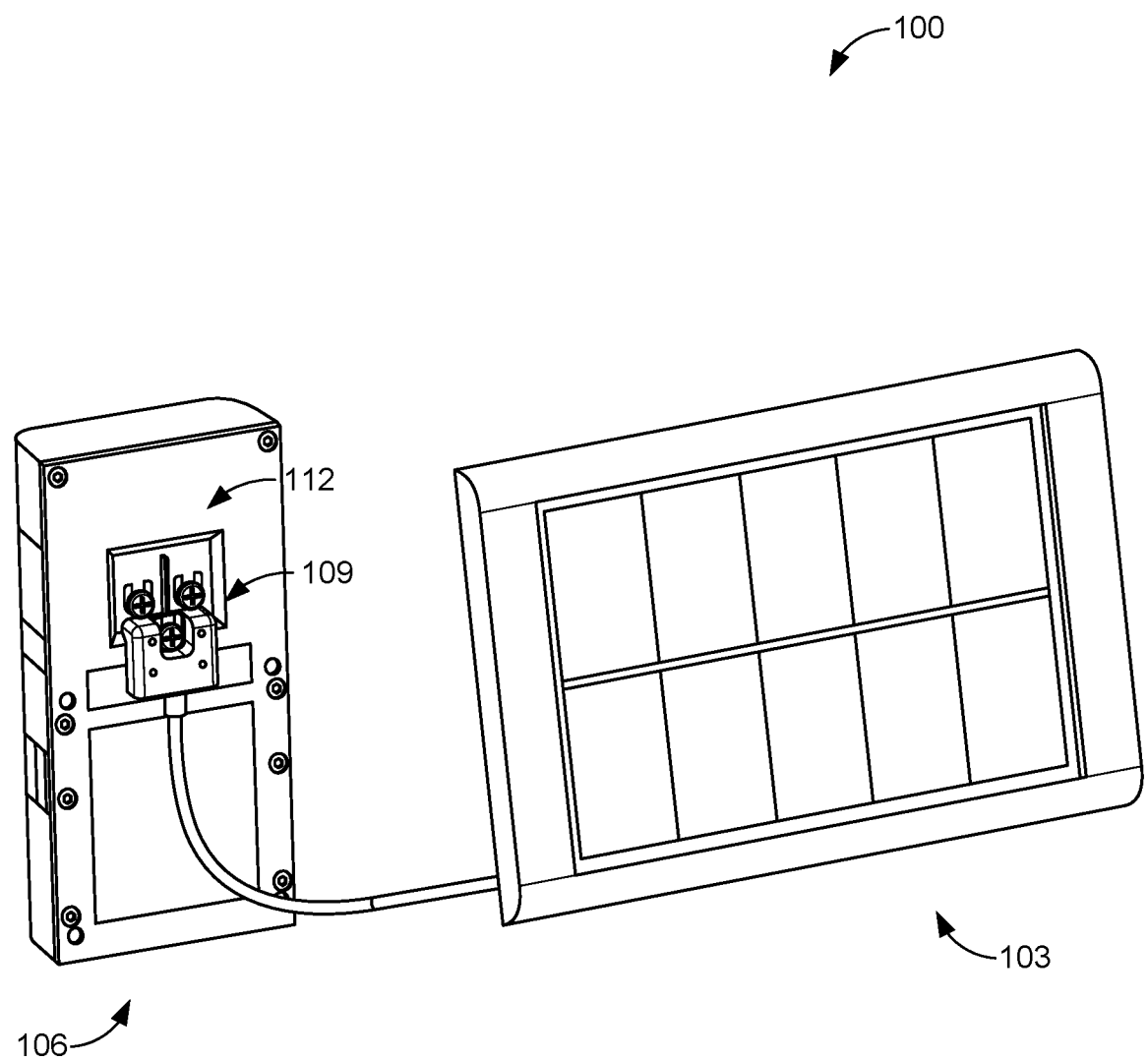
FIG. 1 is a drawing of a solar power system connected to an electronic device according to various embodiments of the present disclosure.

One or more embodiments of the present disclosure are related to a multi-pin power connector of a solar accessory. In some instances, the embodiments include various physical shapes that can be useful to physically and electrically couple a solar accessory with a corresponding docking location at an electronic device. Further, the embodiments can include circuitry for a multi-pin power connector that can be used by an electronic device to identify a type of solar accessory that is connected. In accordance with one or more preferred implementations, the electronic device can determine whether a proper solar accessory is connected. If an incompliant solar accessory is electrically connected, the electronic device can notify a user that the connected solar accessory is not compliant with the electronic device (e.g., by displaying a light or warning on the electronic device or by causing a message or notification to be sent to a user device of the user, such as a phone or tablet).

Typically, the specifications, such as the power requirements, of the electronic device can be evaluated and considered when selecting a solar panel. Solar panels can vary in power output, solar panel efficiency, power tolerances, and other suitable parameters. However, an uninformed user may struggle with selecting the correct solar accessory for a particular device for a variety of reasons. For example, the user may not appreciate the incompatibility or discongruity between the power parameters of a solar accessory and the power parameters of the electronic device. Adding to the difficulty, oftentimes, the power connectors (e.g., power plug) for solar accessories of a first tier and the power connectors for solar accessories of a second tier have the same physical configuration of electrical connectors. Where the power connectors of solar accessories with vastly different power specifications are similar, it can be hard to determine the correct solar accessory for an electronic device.

To address these and other issues, various embodiments of the present disclosure introduce a power connector of a solar accessory (or removably connectable cord) that helps users select an appropriate solar accessory for a particular device. For example, some embodiments of the present disclosure are directed to a three-pin power connector that includes a third pin connector that is offset from a first pin connector and a second pin connector. The third pin connector can be offset along two different axes with respect to the first and second pin connectors. The offset third pin connector can visually and physically help a user identify a proper electronic device that has a correspondingly shaped docking location. An electronic device that is not configured for connection of a three-pin power connector with a specific geometry may not be able to be physically connected, e.g., based on the number of pins and the location of the three pins.

In some embodiments, a multi-pin power connector of a solar accessory can include an electrical component (e.g., a resister, a capacitor, an inductor, etc.) and/or an electrical circuit that enables identification of characteristics of the multi-pin power connector or the solar accessory. An electronic device connected to the solar accessory can measure a voltage or another characteristic or value of an electrical signal associated with the electrical component or the electrical circuit. Each type of solar accessory can have a unique electrical component or electrical circuit, e.g., a resistor with a unique resistance value. The electronic device can identify the type of solar accessory from, for example, a measured voltage for a circuit or circuit path including the electrical component. In the following discussion, a general description of the system and its components is provided, followed by a discussion of the operation of the same.

With reference to FIG. 1, shown is a scenario of a solar power system 100. The solar power system 100 includes a solar accessory 103 and an electronic device 106 according to various embodiments of the present disclosure.

The solar accessory 103 can represent one or more solar harvesting devices. The solar accessory 103 supplies the harvested power to the electronic device 106. The solar accessory 103 can be used to power the electronic device 106 and/or to recharge a battery of the electronic device 106. In the non-limiting example shown in FIG. 1, the electronic device 106 comprises a doorbell camera and the solar accessory 103 comprises a solar panel. Thus, the solar power system 100 can be representative of a solar panel system.

The solar accessory 103 includes a first power connector 109 for electrically coupling with the electronic device 106. In this embodiment, the first power connector 109 includes a first electrical connector, a second electrical connector, and a third electrical connector that are coupled to the electronic device 106. The first and second electrical connectors are each positioned proximate a respective side of the first power connector 109. The first and second electrical connectors are aligned with one another with respect to a first axis and a second axis orthogonal to the first axis. For example, when the power connector 109 is oriented in a first orientation, the first and second electrical connectors are aligned vertically and depthwise, but offset from one another horizontally with one disposed proximate a left side of the power connector 109 and one disposed proximate a right side of the power connector 109.

In accordance with one or more preferred implementations, the third electrical connector is positioned between the first and second electrical connectors, e.g., is positioned horizontally between the first and second electrical connectors when the power connector is in the first orientation. In accordance with one or more preferred implementations, the third electrical connector is offset in at least two dimensions (e.g., along two axes) from the first and second electrical connectors, e.g., an offset positioning of the third electrical connector has two offset dimensions with respect to the first and second electrical connectors. In accordance with one or more preferred implementations, the third electrical connector is not aligned with the first connector with respect to a first axis, not aligned with the second connector with respect to the first axis, not aligned with the first connector with respect to a second axis, and not aligned with the second connector with respect to the second axis. The first power connector 109 can be a combination power connector that enables one or more connectors to extend from its body.

The electronic device 106 can include a power connector or docking location 112 for the first power connector 109. In this example, the docking location 112 includes a docking configuration for mating with the three electrical connectors of the first power connector 109. In the depicted example, the docking configuration has a multi-tier contour with a first surface (e.g., a planar surface) and a second surface (e.g., a planar surface) for mating with one or more surfaces (e.g., a multi-tier contour surface) of the first power connector 109.

In one example, a user can identify an appropriate solar accessory 103 (e.g., solar panel) for attaching to the electronic device 106 (e.g., a video doorbell device) based at least in part on the first power connector 109 physically mating correctly with the docking location 112 on the electronic device 106. In accordance with one or more preferred implementations, if the first power connector 109 of the solar panel does not physically connect to a particular electronic device, then the user is made aware of the fact that the solar panel is not compatible with that electronic device.

In another example, the electronic device 106 can detect electrical coupling of the power connector. The electronic device 106 can be configured to detect and verify particular circuitry in the first power connector 109 or solar accessory 103, e.g., in order to determine a compatible solar accessory is connected. Even further, the electronic device 106 can take measurements associated with the circuitry in order to determine a type of solar accessory that is connected, e.g., a model or brand of solar accessory that is connected. The detected measurements can be used by the electronic device 109 to look up in memory of the electronic device characteristics for a connected solar accessory.

Figure 2A:
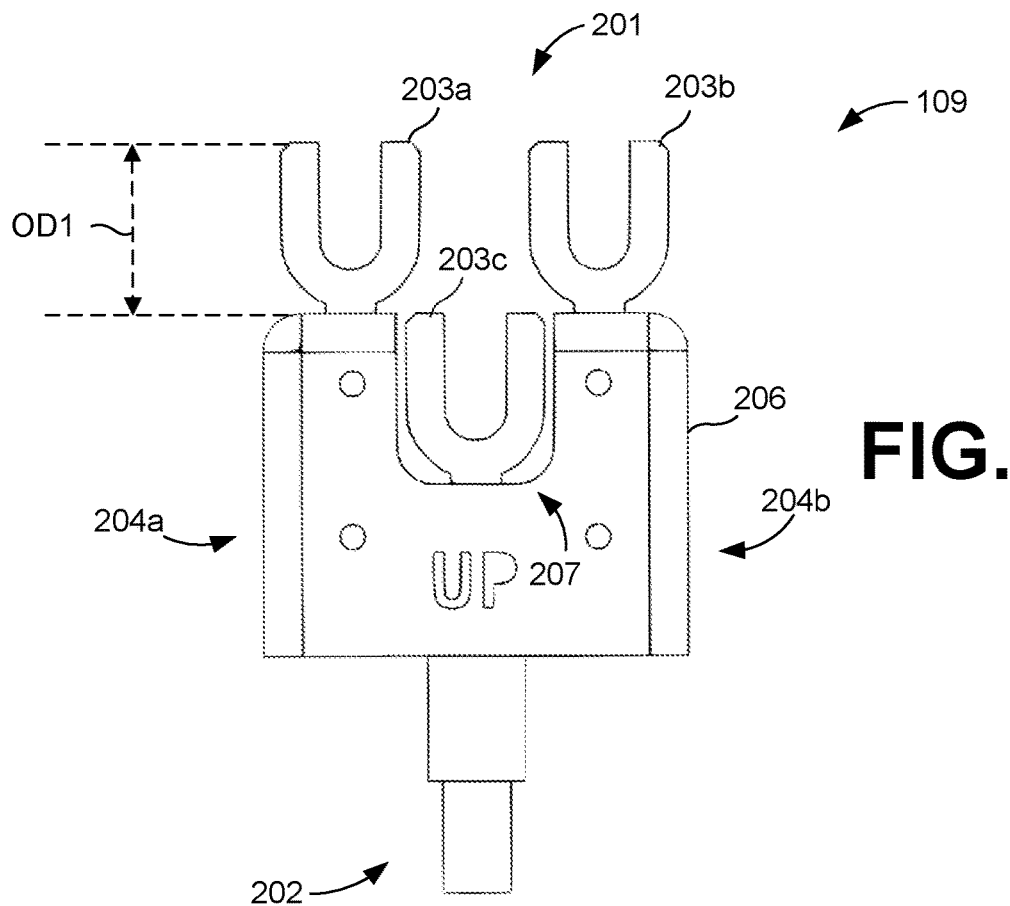
FIGS. 2A and 2B are drawings of a power connector according to various embodiments of the present disclosure.
Figure 2B:
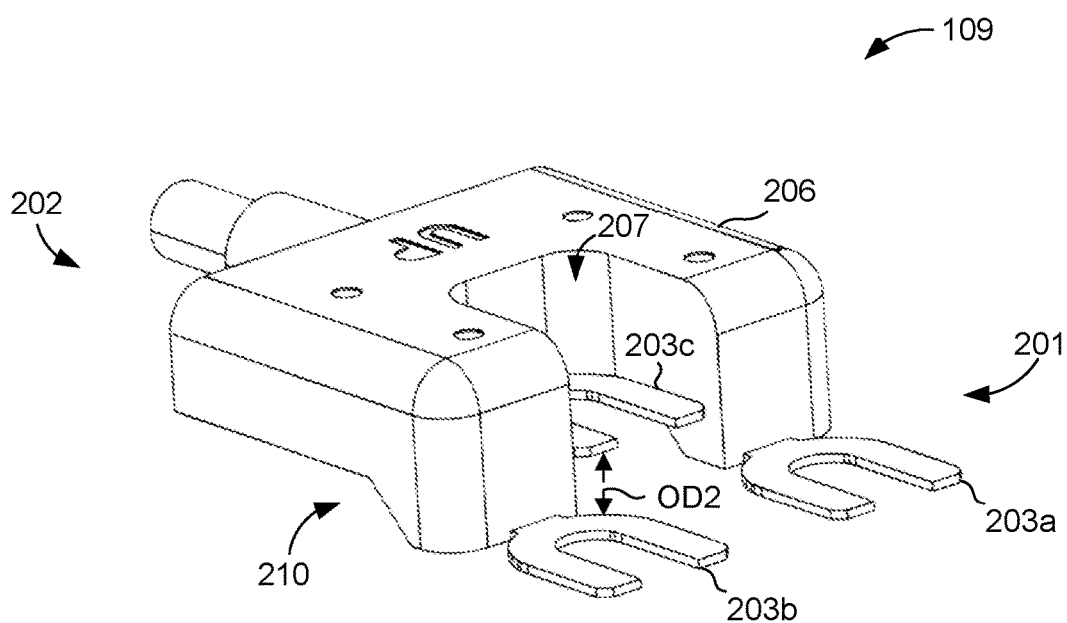

Referring next to FIGS. 2A and 2B, shown are drawings of an example power connector 109 for the solar accessory 103 according to various embodiments of the present disclosure. FIG. 2A is a top down view of the first power connector 109 of the solar accessory 103 from FIG. 1.

As shown, the first power connector 109 has a top end 201 and a bottom end 202. The first power connector 109 can include a first electrical connector 203a, a second electrical connector 203b, a third electrical connector 203c (collectively "the electrical connectors 203"), a connector body 206, and other suitable aspects. Although three electrical connectors 203 are depicted, it should be noted that the number of electrical connectors 203 can vary. In this example, each of the electrical connectors 203 is depicted as a fork terminal or a fork connector. A screw can be used to physically and electrically couple the electrical connectors 203 to the docking location 112 of the electronic device 106. Other types of connectors can be used for the electrical connectors 203.

The connector body 206 can be a structure that holds in place the electrical connectors 203 and may contain other circuitry. In accordance with one or more preferred implementations, the connectors 203a/b/c extend from the connector body 206. In this non-limiting example, the connector body 206 has the first electrical connector 203a positioned along a first side 204a of the connector body 206 and the second electrical connector 203b along a second side 204b of the connector body 206. The connector body 206 includes a first recessed area 207 for the third electrical connector 203c, which can be positioned between the first electrical connector 203a and the second electrical connector 203b. Within the first recessed area 207, the third electrical connector 203c can have a first offset distance OD1 from the top end 201 of the first electrical connector 203a and the second electrical connector 203b. The first electrical connector 203a and the second electrical connector 203b can be aligned with each other at the top end 201. The first electrical connector 203a can be situated or positioned in a common plane with the second electrical connector 203b.

The positioning and the offset distances can be used to form a power connector that facilitates drawing an association between the correct first power connector 109 and a docking location 112 of an electronic device 106. That is to say, the user is able to perceive the compatibility between the first power connector 109 and the docking location 112. It should be noted that the positioning and the offset distances of the electrical connectors 203 can vary.

Moving on to FIG. 2B, shown is a perspective view of the first power connector 109 from FIG. 1. FIG. 2B illustrates that the third electrical connector 203c has a second offset distance OD2. The second offset distance OD2 represents a distance between a first plane of the first electrical connector 203a and the second electrical connector 203b and a second plane of the third electrical connector 203c. Accordingly, the third electrical connector 203c has a first offset distance OD1 and a second offset distance OD2 with respect to the first electrical connector 203a and the second electrical connector 203b.

The connector body 206 can include a second recessed area 210 from a back side. In this example, the second recessed area 210 is a part of the multi-tier contour of the connector body 206. The multi-tier contour of the connector body 206 can be another aspect of a unique shape for mating with a docking location 112. As shown, the lower tier of the second recessed area 210 is on the top end 201 and the higher tier of the second recessed area 210 is on the bottom end 202.

Figure 2C:
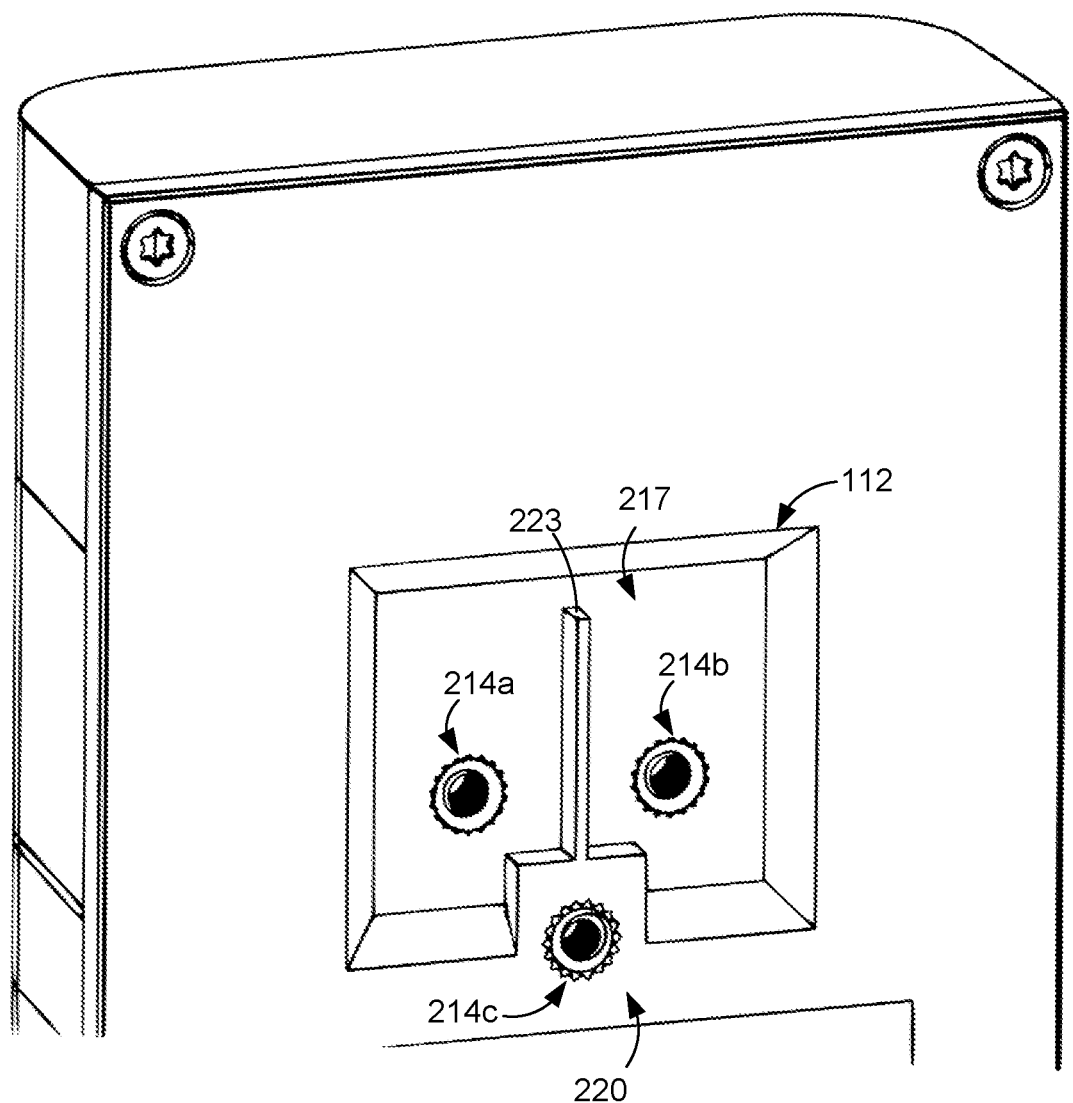
FIG. 2C is a drawing of a docking location for the power connector of FIG. 2A on the electronic device according to various embodiments of the present disclosure.

Turning now to FIG. 2C, shown is a docking location 112 of the first power connector 109 for FIGS. 2A and 2B. The docking location 112 includes a first terminal aperture 214a, a second terminal aperture 214b, a third terminal aperture 214c (collectively "the terminal apertures 214"), and other suitable aspects. The terminal apertures 214 can have an electrically conductive layer. The conductive layer can surround the perimeter surface of the terminal aperture 214. The terminal aperture 214 can be mated with the electrical connectors 203 of the first power connector 109. In the illustrated non-limiting example, the terminal apertures 212 can have threads that are configured to receive a screw. Each screw can be used to attach a respective one of the electrical connectors 203 with the terminal apertures 214.

The docking location 112 can include a recessed area 217 that is configured to mate with the contour of the connector body 206 of the first power connector 109. The recessed area 217 includes the first terminal 214a and the second terminal aperture 214b. The docking location 112 can include an elevated area 220, which includes the third terminal aperture 214c, with respect to the recessed area 217. The elevated area 220 includes an elevated partition 223 that separates the first terminal aperture 214a and the second terminal aperture 214b.

In one non-limiting example of a method of assembly, the solar accessory 103 can be electrically coupled to the electronic device 106 by way of the first power connector 109. The first power connector 109 can be checked to ensure the contour or shape can mate with the first docking location 112 of the electronic device 106. The shape of the first power connector 109 can prevent a physical and electrical connection with a docking location 112 that is incompatible. Then, the electrical connectors 203 (e.g., fork connectors) can be aligned with the terminal apertures 214 for the docking location 112. Thus, each of the three electrical connectors 203 can be aligned with the three terminal apertures 214 for the docking location 112. Subsequently, the electrical connectors 203 can be attached to the terminal apertures 214. For example, each terminal screw can be inserted into each of the terminal apertures 214. In this example, the terminal screws are inserted through a slot of the electrical connectors 203 (e.g., fork connectors). As the terminal screws are inserted, the terminal screws can contact and secure the electrical connectors 203 to the first docking location 112. The electrical connectors 203 and the terminal apertures 214 can be electrically coupled by way of the contact with the terminal screws and/or by the direct contact between the electrical connectors 203 and the terminal apertures 214.

Figure 3A:
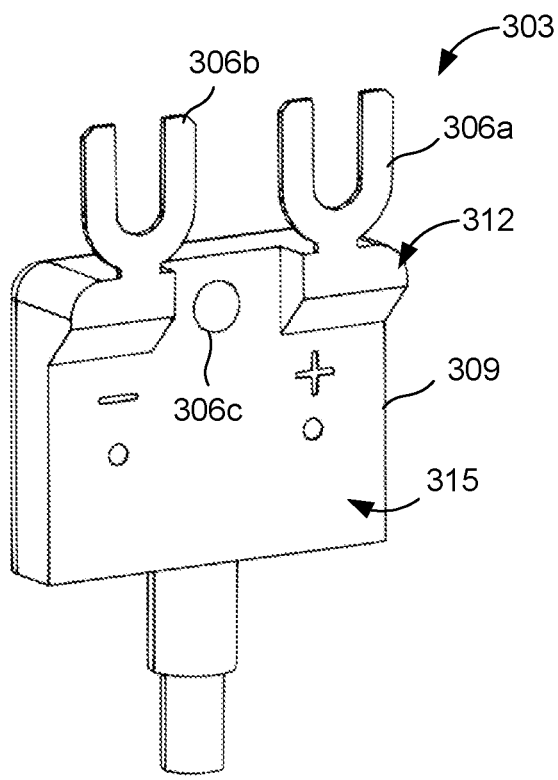
FIGS. 3A and 3B are drawings of another power connector according to various embodiments of the present disclosure.
Figure 3B:
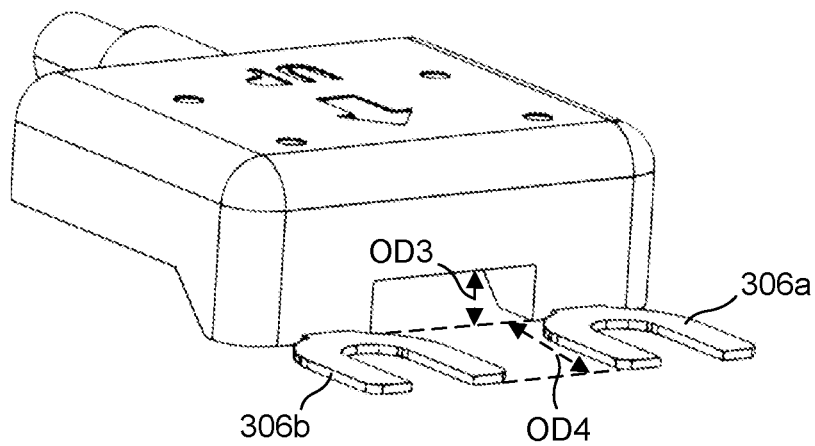

Moving on to FIGS. 3A and 3B, shown are drawings of another example of a second power connector 303 for a solar accessory 103 according to various embodiments of the present disclosure. As such, the second power connector 303 can replace the first power connector 109 for the solar accessory 103. The second power connector 303 can be a combination power connector that enables one or more connectors to extend from its body. FIG. 3A illustrates a bottom perspective view of the second power connector 303. In this example, the second power connector 303 is equipped for an electrical contact location for mating with a spring-loaded pin at a docking location of an electronic device 106. The second power connector 303 includes a first electrical connector 306a, a second electrical connector 306b, a third electrical connector 306c (collectively "the electrical connectors 306"), and a connector body 309.

The first electrical connector 306a and the second electrical connector 306b have a fork connection similar to FIGS. 2A and 2B. The third electrical connector 306c includes an electrical contact location or a pin-receptor connector. Although the third electrical connector 306c is a depicted as a circular area on a bottom surface of the connector body 309, the shape of the third electrical connector 306c can vary. The electrical connector location can be a location for contacting an electrically conductive spring from the docking location on the electronic device 106. In other examples, the location of the third electrical connector 306c can vary on the connector body 309.

The connector body 309 includes an upper tier 312 and a lower tier 315. The upper tier 312 can include the first electrical connector 306a and the second electrical connector 306b. The upper tier 312 can be separated, in which the first electrical connector 306a has a first area and the second electrical connector 306b has a second area. The lower tier 315 includes the third electrical connector 306c.

FIG. 3B illustrates a perspective view of the second power connector 303. The third electrical connector 306c has two offset dimensions (e.g., offset distances) from the first electrical connector 306a and the second electrical connector 306b. Although FIG. 3B illustrates two offset dimensions as offset distances, the offset dimension can include other dimensions (e.g., offset planes, offset angles of orientation, etc.) with respect to the first electrical connector 306a and/or the second electrical connector 306b. A third offset distance OD3 can represent a distance from the upper tier area 312 and the lower tier area 315 with respect to the third electrical connector 306c. A fourth offset distance OD4 can represent a distance from a top end of the first electrical connector 306a and the second electrical connector 306b to the third electrical connector 306c.

Figure 3C:
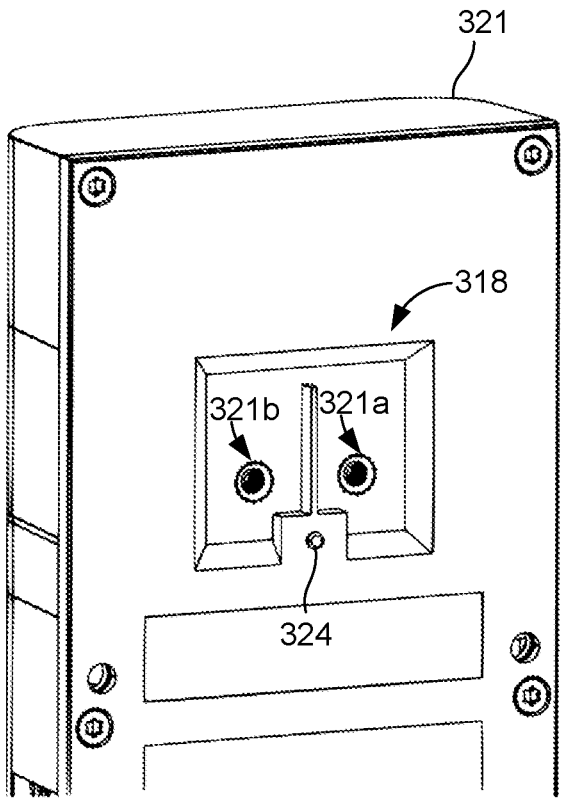
FIGS. 3C and 3D are drawings of another docking location for the power connector of FIG. 3A on an electronic device according to various embodiments of the present disclosure.

Turning now to FIG. 3C, shown is a second docking location 318 for the second power connector 303 for FIGS. 3A and 3B. The second docking location 318 can represent an alternative docking location for the second power connector 303. Since the second power connector 303 has a different set of electrical connectors 306, the second docking location 318 of an electronic device 106 is configured to mate with the contours of the second power connector 303 and the connector types of the electrical connectors 306.

The second docking location 318 includes a first terminal aperture 321a, a second terminal aperture 321b, and a spring pin 324. The first terminal aperture 321a and the second terminal aperture 321b can be similar to the terminal apertures 214 of FIG. 2C. The spring pin 324 can contact the third electrical connector 306c from FIGS. 3A and 3B. In this example implementation, the spring pin 324 is configured to contact and electrically connect with the third electrical connector 306c. As a force is applied to the spring pin 324 by the third electrical connector 306c, the spring pin 324 moves toward the second docking location 318.

In another non-limiting example of a method of assembly, the solar accessory 103 can be electrically coupled to the electronic device 106 by way of the second power connector 303. The second power connector 303 can be checked to ensure the contour or shape can mate with the second docking location 318 of the electronic device 106. Then, the electrical connectors 306 (e.g., two fork connectors and one contact location) can be aligned with the terminal apertures 321 for the second docking location 318. Thus, each of the three electrical connectors 306 can be aligned with the three terminal apertures 321 for the second docking location 318. Subsequently, a terminal screw can be inserted into each of the terminal apertures 321a and 321b. In this example, the terminal screws are inserted through a slot of the electrical connectors 306a and 306b (e.g., two fork connectors). As the terminal screws are inserted, the terminal screws can contact and secure the electrical connectors 306 to the second docking location 318. The electrical connectors 306 and the terminal apertures 321 can be electrically coupled by way of the contact with the terminal screws and/or by the direct contact between the electrical connectors 306 and the terminal apertures 321. Further, because of the alignment of the second power connector with the second docking location 318, the spring pin 324 can contact the third electrical connector 306c (e.g., contact location). The spring pin 324 can be displaced as contact is made with the third electrical connector 306c.

Figure 3D:
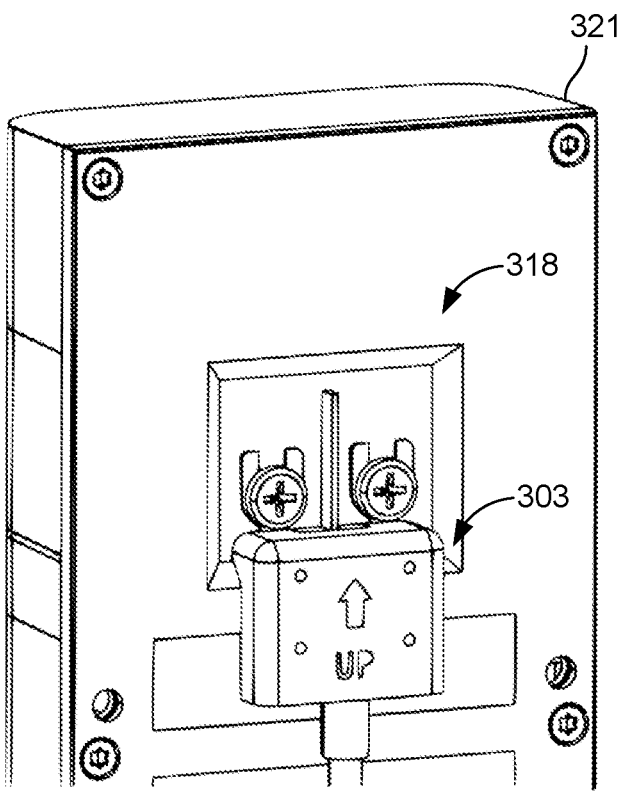

FIG. 3D illustrates is a drawing of the second power connector 303 coupled at the second docking location 318. FIG. 3D illustrates that two terminal screws are used instead of three terminal screws as shown in FIG. 1. The screw terminals hold the third connector 306c against the spring pin 324.

Figure 4A:
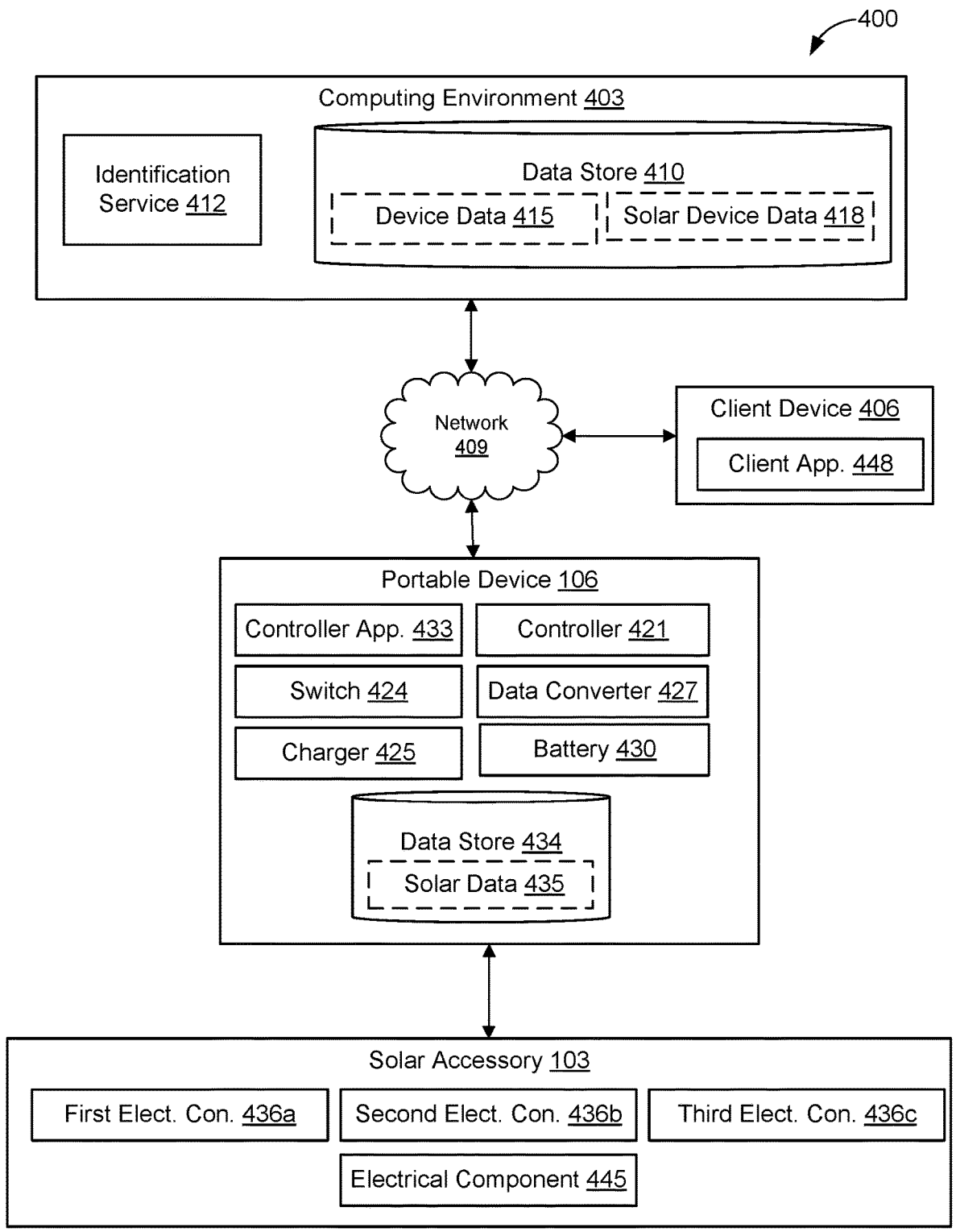
FIG. 4A is a drawing of a networked environment according to various embodiments of the present disclosure.

With reference to FIG. 4A, shown is a networked environment 400 according to various embodiments. The networked environment 400 includes a computing environment 403, client device 406 and the electronic device 106, which are in data communication with each other via a network 409. The network 409 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 403 may comprise, for example, a server computer or any other system providing computing capability. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource and/or any other distributed computing arrangement. In some cases, the computing environment 403 may correspond to an elastic computing resource where the allotted capacity of processing, network, storage, or other computing-related resources may vary over time.

Various applications and/or other functionality may be executed in the computing environment 403 according to various embodiments. Also, various data is stored in a data store 410 that is accessible to the computing environment 403. The data store 410 may be representative of a plurality of data stores 409 as can be appreciated. The data stored in the data store 410, for example, is associated with the operation of the various applications and/or functional entities described below.

The components executed on the computing environment 403, for example, can include an identification service 412, and other applications, services, processes, systems, engines, or functionality not discussed in detail herein. The identification service 412 is executed to identify a solar accessory 103 that is connected to the electronic device 106. The identification service 412 can be executed to serve contact to the client device 406.

The data stored in the data store 410 includes, for example, device data 415, solar device data 418, and potentially other data. The device data 415 can represent data associated with the client device 406 and the electronic device 106. For example, the device data 415 can include a device identifier, a user identifier associated with a device, data characteristics, and other suitable device data 415. The device characteristics can include hardware characteristics (e.g., memory amount, battery levels, etc.) and software characteristics (e.g., an operating system, list of installed applications, firmware version, etc.). The solar device data 418 can represent data associated with the solar accessory 103, such as a type of solar accessory, the power output parameters for the solar accessory 103, the power efficiency, identifying characteristics of the solar accessory 103 (e.g., measurable electrical characteristics of the solar accessory 103), and other suitable solar accessory characteristics.

The electronic device 106 can represent one or more devices capable of operating on battery power. The electronic device 106 can represent a device that may not have a wired power supply. In some instances, the electronic device 106 can be attached to a fixed structure at a location that does not have a wired power line. For example, the electronic device 106 can be a video doorbell device that is situated at a location where a power line is not available for the video doorbell device. The electronic device 106 can include a controller 421, a switch 424, a charger 425, a data converter 427, a battery 430, and other suitable components. Some non-limiting examples of an electronic device 106 can include a security camera device, a video doorbell device, a lighting device, and a security alarm device.

The controller 421 can represent or comprise one or more processing devices, such as a processor, a microcontroller, a field programmable gate array, an application-specific integrated circuit (ASIC), and other suitable processing devices. In accordance with one or more preferred implementations, controller 421 is a microcontroller comprising one or more processors and memory. In accordance with one or more preferred implementations, an electronic device comprises a processor of a controller and one or more additional processors.

Various applications and/or other functionality may be executed in the electronic device 106 according to various embodiments. The controller 421 or another processor can execute a controller application 433 for interfacing with the solar accessory 103. The controller application 433 can be executed to identify a type of solar accessory 103 that is electrically coupled to the electronic device 106. The controller application 433 can be executed to communicate with the identification service 412.

Also, various data is stored in a data store 434 that is accessible to the electronic device 106. The data store 434 can include solar data 435 that represents characteristics of various solar accessories 103. The solar data 435 can be used by the controller application 433 to identify a particular solar accessory 103 and other characteristics associated with the solar accessory 103. The data store 434 may be part of a memory or storage of the controller 421, or may be memory or storage separate from the microcontroller 421.

In accordance with one or more preferred implementations, the switch 424 comprises one or more electrical components for switching on or off the power being supplied by the solar accessory 103. The switch 424 can be controlled by the controller application 433. Some non-limiting examples of the switch 424 can include p-channel metal-oxide semiconductor transistor, n-channel metal-oxide semiconductor transistor, and other suitable switches, e.g., software-controllable switches or hardware-controllable switches.

In accordance with one or more preferred implementations, the charger 425 comprises one or more circuit components that can charge the battery 430 with solar power supplied by the solar accessory 103. The charger 425 can be controlled by the controller application 433.

In accordance with one or more preferred implementations, the controller 421 is coupled to an analog line and samples a voltage value of the analog line using an analog-to-digital converter to convert the sample to a digital value. In accordance with one or more preferred implementations, this analog-to-digital converter is part of the controller 421.

In accordance with one or more preferred implementations, an electronic device comprises a data converter 427 for converting an analog voltage or current measurement to a digital value. The data converter 427 can be electrically coupled to one or more portions of the solar accessory 103 for measurements. The data converter 427 can be used to measure the analog voltage at one or more locations associated with the solar accessory 103. The data converter 427 can be an analog-to-digital converter, an integrated converter of the controller 421, and other suitable components for measuring an analog signal from the solar accessory 103. In accordance with one or more preferred implementations, a data converter 427 is used outside of the controller 421.

The battery 430 can be a rechargeable energy storage component. The battery 430 can include recharging circuitry that is controlled by the controller 421. The solar accessory 103 can represent one or more solar harvesting devices. The solar accessory 103 supplies the harvested power to the electronic device 106. The solar accessory 103 can be used to power the electronic device 106 and/or to recharge the battery 430 of the electronic device 106. The solar accessory 103 can include one or more solar panels. The solar accessory 103 can include a first electrical connector 436a, a second electrical connector 436b, a third electrical connector 436c (collectively "the electrical connectors 436"), a first electrical component 445, and other suitable components.

The electrical connectors 436 can be housed in a power connector (e.g., FIGS. 2A and 2B (109), FIG. 3A (303)) that is connected to the electronic device 106. The electrical connectors 436 are used to electrically couple the solar accessory 103 to the electronic device 106. The first electrical component 445 can be a circuit component that is measured by the analog-to-digital data converter 427. The controller 421 can access the data from the data converter 427. The third electrical connector 426c can have one or more offset dimensions with respect to one or both of the first electrical connector 436a and the second electrical connector 436b. For example, the offset dimensions can include an offset distance, an offset plane, an offset angle, and other suitable offset dimensions.

The first electrical component 445 can be configured to have a specific characteristic value (e.g., a specific resistance value) in order for the controller 421 to identify characteristics associated with the solar accessory 103, such as the model, the solar accessory type, the manufacturer, and other suitable characteristics. The first electrical component 445 can be a resistor, a capacitor, an inductor, a transistor, a thermistor, an oscillator, a combination of circuit components, and other suitable circuit components. The values of the first electrical components 445 can vary. The combination of the selected electrical components 445 and the values of the selected electrical components 445 can provide a specific signature for identifying the solar accessory 103.

The client device 406 is representative of a plurality of client devices 406 that may be coupled to the network 409. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 406 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 448 and/or other applications. The client application 448 may be executed in a client device 406, for example, to access network content served up by the computing environment 403 and/or other servers, thereby rendering a user interface on the display. To this end, the client application 448 may comprise, for example, a browser, a dedicated application, etc., and the user interface may comprise a network page, an application screen, etc. The client device 406 may be configured to execute applications beyond the client application 448 such as, for example, email applications, social networking applications, word processors, spreadsheets, and/or other applications.

Next, a general description of the operation of the various components of the networked environment 400 is provided. To begin, the first power connector 109 can be selected based at least in part on the physical shape or contour of the first power connector 109 corresponding to the first docking location 112 of the electronic device 106. For example, the first power connector 109 can have three fork connectors as electrical connectors 436. The quantity of electrical connectors 203 and the physical locations of each electrical connector 203 can be matched to the recipient terminals 454 at the docking location 112. In this fork connector example, the fork connectors can be aligned adjacent to the recipient terminals 454, in which the recipient terminals 454 are accessible through the slot of the fork connectors. Then, terminal screws can be inserted through the slot of the fork connectors and into the recipient terminals 454.

Subsequently, the controller application 433 can identify a power supply connection for recharging the battery 430 of the electronic device 106. In some instances, the controller application 433 can identify the power supply connection by sensing a voltage or a current on one or more of the recipient terminals 454.

Figure 4B:
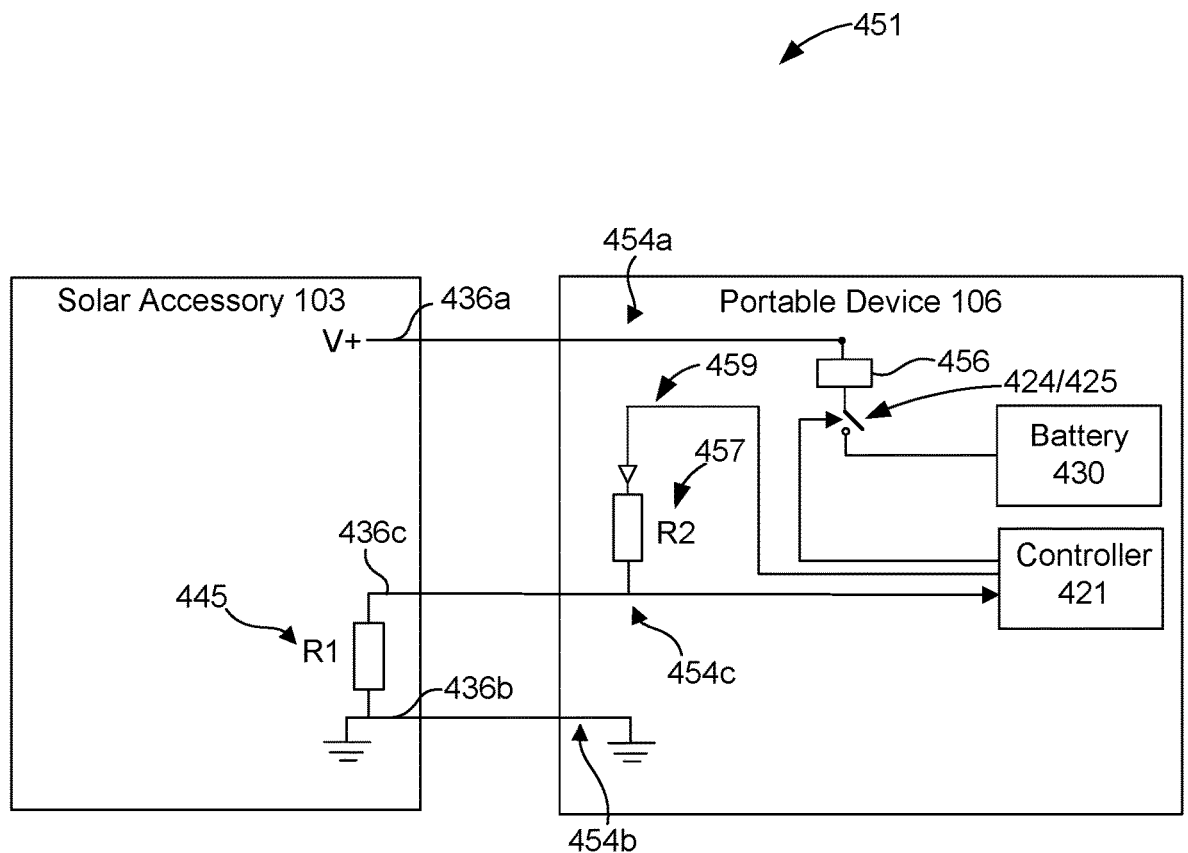
FIG. 4B is an example schematic diagram of an implementation for FIG. 4A according to various embodiments of the present disclosure.

Next, the controller application 433 can activate a switch 424 or the charger 425 to charge the battery 430. In some examples, the battery 430 can provide power to the first electrical component 445 and the controller 421. In accordance with one or more preferred implementations, the controller 421 is powered by the battery 430, and the controller 421 can cause power to be supplied over a line connecting the controller to the resistor 457, as illustrated in FIG. 4B. As a result, the controller application 433 can identify the connection with the solar accessory 103 even when there is no or little available solar power (e.g., during dusk to dawn hours).

Then, the controller application 433 can measure a voltage or current value (or other value) by sampling the analog line coupled to the controller 421 using an analog-to-digital converter to determine a digital value. The measured analog value can be a current value, a voltage value, or other suitable value associated with the analog line.

In some examples, the controller application 433 can determine whether the solar accessory 103 (e.g., solar panel) is a proper solar accessory 103 for the electronic device 106 based at least in part on the digital value. The controller application 433 can use the digital value to compare to various stored digital values in the solar data 435.

For instance, the controller application 433 can identify whether a proper solar panel (e.g., a particular solar panel type) is connected to the electronic device 106. In some instances, the electronic device 106 can generate a notification (e.g., an audible notification, a display notification, a tactical notification) whether a proper or valid solar panel is attached to the electronic device 106.

Then, the controller application 433 can deactivate the switch 424 by generating a second control signal or releasing the first control signal for the switch 424. By deactivating the switch 424, the switch 424 opens a circuit line and disconnects a voltage applied to the one or more electrical components 445. In some examples, the controller application 433 can active the switch 424 every time the electrical connectors 436 are attached to the electronic device 106.

Moving next to FIG. 4B, shown is an example schematic diagram 451 of a solar accessory 103 attached to the electronic device 106. The schematic diagram 451 represents one example of the wiring connections between the solar accessory 103 and the electronic device 106. As shown, the electrical connectors 436 of the solar accessory 103 are electrically coupled to a first recipient terminal 454a, a second recipient terminal 454b, and a third recipient terminal 454c (collectively "the recipient terminals 454"). The recipient terminals 454 are representative of the terminal apertures, spring pins, and other suitable terminals on the electronic device 106 (see e.g., FIG. 2C (214), FIG. 3C (321, 324)). The electrical connectors 436 can be representative of the first electrical connectors 203a (FIGS. 2A and 2B) and/or the electrical connectors 306 (FIGS. 3A and 3B).

In FIG. 4B, the first electrical connector 436a is electrically coupled to the first recipient terminal 454a. The first electrical connector 436a is coupled to a line providing a positive voltage source (V+) or input voltage generated by the solar panel. The first electrical connector 436a is electrically coupled to the first recipient terminal 454a. The second electrical connector 436b is electrically coupled to a ground line. The second electrical connector 436b is electrically coupled to a line coupled to the first electrical component 445, which is shown as a resistor R1 in FIG. 4B. The first electrical component 445 is coupled to the ground line coupled to the third electrical connector 436c. The third electrical connector 436c is electrically coupled to the first recipient terminal 454a.

On the electronic device 106, the first recipient terminal 454a can be coupled to a power regulation circuit 456, which is coupled to a switch 424 or the charger 425. The power regulation circuit 456 can be configured to regulate the input power down from the voltage power source (e.g., input voltage from the solar accessory 103) down to a lower voltage (e.g., 3.3 V or 1.8 V). In other implementations, the power regulation circuit 456 can be omitted.

The switch 424 and/or the charger 425 can be coupled to the controller 421 and can be controlled by the controller 421. The switch 424 and/or the charger 425 can be activated to recharge the battery 430. The switch 424 and/or the charger 425 can be configured to open and close a connection to the battery 430. The controller 421 can be electrically coupled to the second electrical component 457, which in turn can be coupled to the third recipient terminal 454c. The controller 421 can be coupled to the second electrical component 457 by an output line 459. The output line 459 can be coupled to a pin of the controller 421 can activate and deactivate a voltage output. The controller 421 can activate and deactivate a positive output voltage to the output line 459. As such, the output voltage applied to the second electrical component 457 can be turned on and off by the controller 421. The third recipient terminal 454c can be coupled to an input of the controller 421. The input can be electrically coupled to a data conversion component (e.g., data converter 427).

When the controller 421 activates an output voltage to the output line 459, a first portion of the output voltage can be applied to the second electrical component 457 (resistor R2). A second portion of the output voltage can be applied to the first electrical component 445 (resistor R1). The second portion of the output voltage can be determined based on measuring a voltage value at an input line coupled to the controller 421 using a data converter 427. The data converter 427 can generate a value that is indicative of the second portion of the output voltage. The value can be used to identify the solar accessory 103. The controller 421 can use the value to determine a characteristic associated with the solar accessory 103, such as a brand, a model, a solar accessory type, and other suitable characteristics.

When the solar accessory 103 and the electronic device 106 are attached, the first electrical component 445 and the second electrical component 457 can represent a voltage divider circuit. Other circuit configurations can be used to provide a measurable component for identifying the solar accessory 103.

In alternative embodiments, a battery can be used to supply power to the second electrical component 457, which in turn can be coupled to the third recipient terminal 454c. The third recipient terminal 454c can be coupled to an input of the controller 421. The input can be electrically coupled to a data conversion component (e.g., data converter 427).

In this alternative embodiment, the battery output can provide an output voltage to the second electrical component 457 and the first electrical component 445 when the solar accessory 103 is attached to the electronic device 106. A first portion of the output voltage can be applied to the second electrical component 457 (resistor R2). A second portion of the output voltage can be applied to the first electrical component 445 (resistor R1). The second portion of the output voltage can be measured by the input of the controller 421 using a data converter 427. The data converter 427 can generate a value that is representative of the second portion of the output voltage. The value can be used to identify the solar accessory 103. The controller 421 can use the value to determine a characteristic associated with the solar accessory 103, such as a brand, a model, a solar accessory type, and other suitable characteristics.

In some further examples, the schematic 451 can include another switch between the battery output and the second electrical component 457. The other switch can be controlled by the controller application 433 for connecting or disconnecting an electrical connection between the battery output and the second electrical component 457. The other switch may be used to conserve battery power.

Figure 4C:
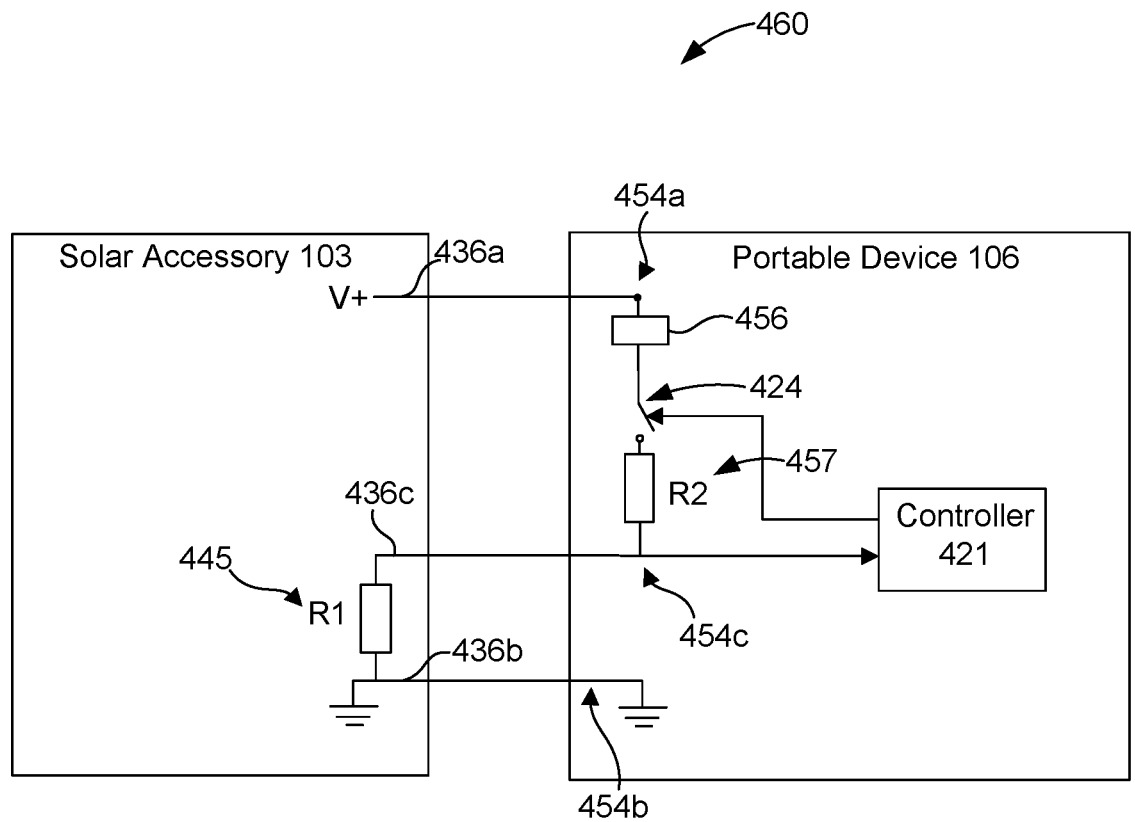
FIG. 4C is another example schematic diagram of an implementation for FIG. 4A according to various embodiments of the present disclosure.

Referring next to FIG. 4C, shown is an example schematic diagram 460 of a solar accessory 103 attached to the electronic device 106. The schematic diagram 460 represents one example of the wiring connections between the solar accessory 103 and the electronic device 106. As shown, the electrical connectors 436 of the solar accessory 103 are electrically coupled to a first recipient terminal 454a, a second recipient terminal 454b, and a third recipient terminal 454c (collectively "the recipient terminals 454"). The recipient terminals 454 are representative of the terminal apertures, spring pins, and other suitable terminals on the electronic device 106 (see e.g., FIG. 2C (214), FIG. 3C (321, 324). The electrical connectors 436 can be representative of the first electrical connectors 203a (FIGS. 2A and 2B) and/or the electrical connectors 306 (FIGS. 3A and 3B).

In FIG. 4B, the first electrical connector 436a is electrically coupled to the first recipient terminal 454a. The first electrical connector 436a has a positive voltage source (V+) or input voltage. The second electrical connector 436b is electrically coupled to the second recipient terminal 454b. The second electrical connector 436b is electrically coupled to ground. The second electrical connector 436b is electrically coupled to the first electrical component 445, which is shown as a resistor R1 in FIG. 4B. The first electrical component 445 is coupled to the third electrical connector 436c. The third electrical connector 436c is electrically coupled to the first recipient terminal 454a.

On the electronic device 106, the first recipient terminal 454a can be coupled to a power regulation circuit 456, which is coupled to a switch 424. The power regulation circuit 456 can be configured to regulate the input power down from the voltage power source (e.g., input voltage from the solar accessory 103) down to a lower voltage (e.g., 3.3 V or 1.8 V). In other implementations, the power regulation circuit 456 can be omitted.

The switch 424 can be coupled to the controller 421. The switch 424 can be configured to open and close a connection to a second electrical component 457 or portion of circuitry. The second electrical component 457 can be coupled to the third recipient terminal 454c. The third recipient terminal 454c can be coupled to an input of the controller 421. The input can be electrically coupled to a data conversion component (e.g., data converter 427).

In this implementation, the switch 424 can be activated by the controller 421. A first portion of the output voltage from the power regulation circuit 456 can be applied to the second electrical component 457 (resistor R2) via the switch 424. A second portion of the output voltage can be applied to the first electrical component 445 (resistor R1). The second portion of the output voltage can be determined based on the input of the controller 421 using a data converter 427. The data converter 427 can generate a value that is indicative of the second portion of the output voltage. The value can be used to identify the solar accessory 103. The controller 421 can use to the value to determine a characteristic associated with the solar accessory 103, such as a brand, a model, a solar accessory type, and other suitable characteristics.

When the switch 424 is closed, the first electrical component 445 and the second electrical component 457 can represent a voltage divider circuit. Other circuit configurations can be used to provide a measurable component for identifying the solar accessory 103.

In accordance with one or more preferred implementations utilizing circuits such as illustrated in FIGS. 4B-C, a resistance value R1 of a resistor representing first electrical component 445 can be determined based on: a known resistance value R2 of a resistor representing second electrical component 457; a value Vs of voltage supplied to the resistor representing second electrical component 457; and a value Vr of a voltage reading on an analog input line to the controller. It will be appreciated that this represents a simple voltage divider with the value Vs being a voltage in and the value Vr being a voltage out.

It will be appreciated that the voltage reading value Vr generally corresponds to the resistance value R1 of the resistor representing first electrical component 445 times a current value I1 of that resistor given the supplied voltage value Vs, i.e., $Vr=R1*I1$. The current value I1 of the resistor is the same as the current value I2 of the resistor representing second electrical component 457. The current value generally corresponds to the supplied voltage value Vs divided by the sum of R1 and R2, i.e. $I1=I2=I=Vs/(R1+R2)$. Substituting, one can get $Vr=R1*VDDIO/(R1+R2)$. This can be rearranged to solve for R1 as $R1=R2/(Vs/Vr-1)$.

In another embodiment, another power connector in the form factor of a Universal Serial Bus Type-C (USB-C) can be used by the solar accessory 103. The other power connector can be used instead of the first power connector 109 or the second power connector 303. The pins for USB-C power connector can be wired according to the schematic diagram 451, schematic diagram 460, or another suitable schematic. As one non-limiting example, the solar accessory 103 can have a male USB-C power connector for attaching to a female USB-C connector on the electronic device 106. The male USB-C power connector can have a bus power pin provide power to the first recipient terminal 454a. A ground pin of the male USB-C power connector can be electrically coupled to the second recipient terminal 454b. A sideband pin can be electrically coupled to the third recipient terminal 454c. As such, the sideband pin can be electrically coupled to the first electrical component 445. The controller 421 can cause a data converter 427 to measure an analog signal from the third recipient terminal 454c. Other USB power connectors can used as well, such at least USB-Micro-B, USB Type-A, USB Type-B, and other suitable USB power connectors.

Figure 5A:
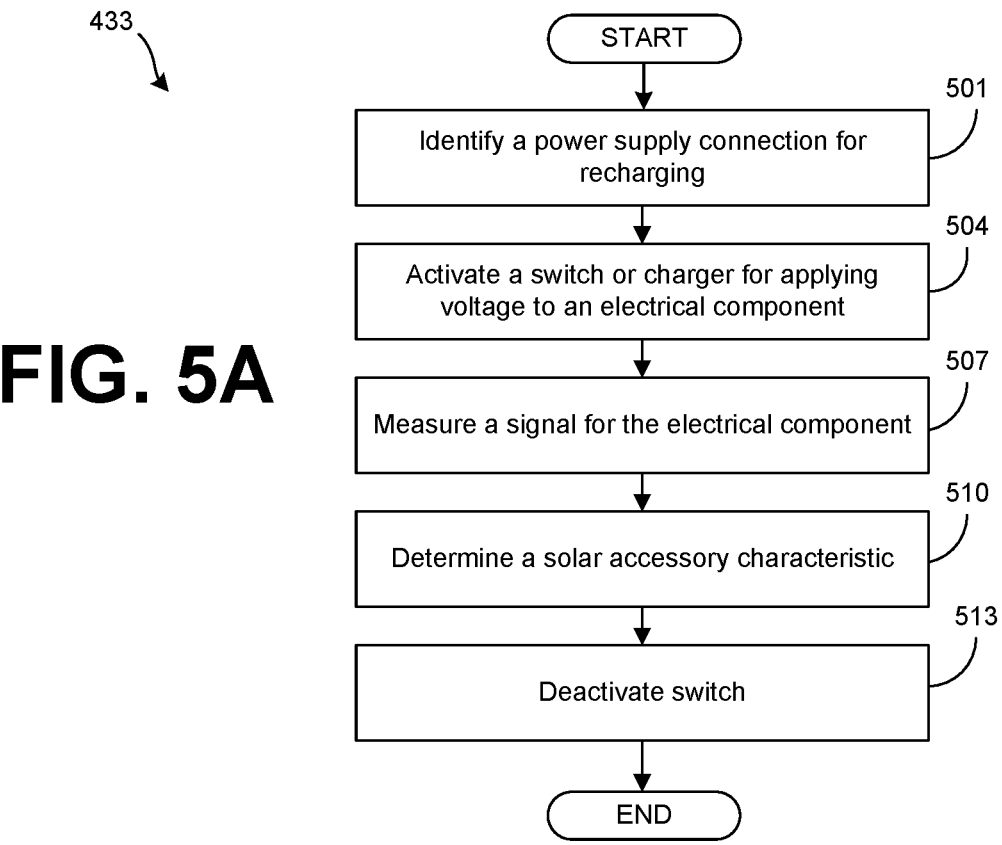
FIGS. 5A and 5B are flowcharts illustrating one example of functionality implemented as portions of a controller application executed in a client device in the networked environment of FIG. 4A according to various embodiments of the present disclosure.

Referring next to FIG. 5A, shown is a flowchart that provides one example of the operation of a portion of the controller application 433 according to various embodiments. It is understood that the flowchart of FIG. 5A provides merely an example of the many different types of functional arrangements that may be employed to implement the operation of the portion of the controller application 433 as described herein. As an alternative, the flowchart of FIG. 5A may be viewed as depicting an example of elements of a method implemented in the electronic device 106 (FIG. 4A) according to one or more embodiments.

It is assumed that a power connector (e.g., the first power connector 109 (FIGS. 2A and 2B) or the second power connector 303 (FIGS. 3A and 3B)) can be electrically coupled to a docking location (e.g., the first docking location 112 or the second docking location 318) of the electronic device 106. The physical dimensions of the power connector can be mated with a docking location with a corresponding contour.

Beginning with box 501, the controller application 433 can identify a power supply connection for recharging the battery 430 of the electronic device 106. In some instances, the controller application 433 can identify the power supply connection by sensing a voltage on one or more of the recipient terminals 454.

In box 504, the controller application 433 can activate a switch 424 or a charger 425. In some examples, the switch 424 can be activated for applying a voltage to one or more electrical components (e.g., the first electrical component 445, the second electrical components 457). The switch 424 can be activated by the controller application 433 generating a control signal for the switch 424. By activating the switch 424, the switch 424 can close the circuit line that applies voltage to one or more electrical components 445.

In other examples, the controller application 433 can activate an output voltage to the output line 459, which will activate a voltage divider circuit that includes the first electrical component 445 and the second electrical component 457. By activating the voltage divider circuit, the controller application 433 can measure an analog signal (e.g., voltage) across the first electrical component 445.

In other examples, the battery output can provide an output voltage to the second electrical component 457 and the first electrical component 445 when the solar accessory 103 is attached to the electronic device 106. In these examples, the switch 424 or the charger 425 can be activated to supply a voltage to the battery 430 for recharging. In some instances, box 504 can be omitted because the battery output can provide an output voltage to the second electrical component 457 and the first electrical component 445 without activating the switch 424 or the charger 425.

In box 507, the controller application 433 can measure an analog signal for a first electrical component 445 in the solar accessory 103 using a data converter 427. The data converter 427 can include an integrated analog-to-digital converter of the controller 421 or a discrete data converter. The measured analog signal can be a current signal, a voltage signal, or other suitable signals associated with the first electrical component 445. The measured analog signal can be converted to a digital value by the data converter 427.

In some examples, the controller application 433 can measure the analog signal without activating the switch 424 or the charger 425 because the controller application 433 can activate an output voltage to be applied to the output line 459. The output voltage can activate a voltage divider circuit that includes the first electrical component 445 and the second electrical component 457.

In some examples, the controller application 433 can measure the analog signal without activating the switch 424 or the charger 425 because the battery output can supply power to the second electrical component 457 and the first electrical component 445 (e.g., FIG. 4B). In some instances, the controller application 433 can trigger the measurement of the analog signal associated with the first electrical component 445 based at least in part upon demand, a periodic time interval, a detection of an electrical or a physical connection with the solar accessory 103, and/or other suitable criteria. In other examples, the activation of the switch 424 or the charger 425 can also cause a measurement of the first electrical component 445.

In box 510, the controller application 433 can determine a characteristic associated with the solar accessory 103 based at least in part on the digital value. The controller application 433 can use the digital value to compare to various stored digital values in the solar data 435. Some non-limiting examples of a characteristic can include a device type for the solar accessory 103, a model type, a brand, and other suitable characteristics for the solar accessory 103.

For example, the controller application 433 can identify that whether a proper solar panel (e.g., a particular solar panel type) is connected to the electronic device 106. In some instances, the electronic device 106 can generate a notification (e.g., an audible notification, a display notification, a tactical notification, etc.) whether the proper or valid solar panel is attached to the electronic device 106. In some instances, the electronic device 106 can transmit the determined characteristics to the client application 448 and/or the identification service 412.

In box 513, the controller application 433 can deactivate the switch 424 by generating a second control signal for the switch 424. By deactivating the switch 424, the switch 424 opens a circuit line and disconnects a voltage applied to the one or more electrical components 445. In some embodiments, box 513 can be omitted. For example, the battery output can provide an output voltage to the second electrical component 457 and the first electrical component 445 when the solar accessory 103 is attached to the electronic device 106. As such, in this example, the switch 424 or the charger 425 may not be needed to provide an output voltage to the second electrical component 457 and the first electrical component 445. Accordingly, the switch 424 or the charger 425 does not need to be deactivated. Then, the controller application 433 proceeds to the end.

Figure 5B:
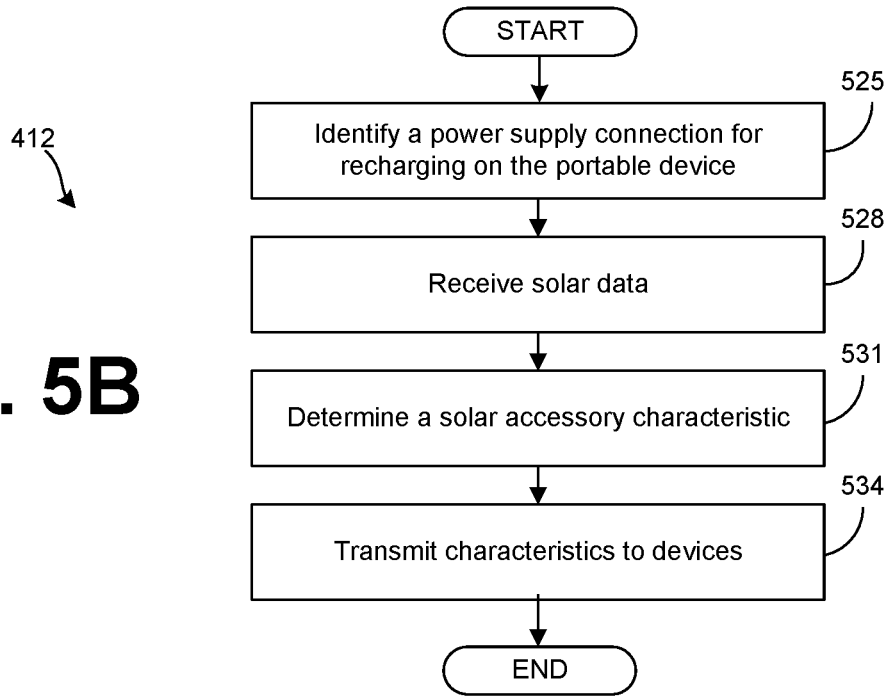

Referring next to FIG. 5B, shown is a flowchart that provides one example of the operation of a portion of the identification service 412 according to various embodiments. It is understood that the flowchart of FIG. 5B provides merely an example of the many different types of functional arrangements that may be employed to implement the operation of the portion of the identification service 412 as described herein. As an alternative, the flowchart of FIG. 5B may be viewed as depicting an example of elements of a method implemented in the electronic device 106 (FIG. 4A) according to one or more embodiments.

Beginning with box 525, the identification service 412 can identify a power supply connection for recharging on the electronic device 106. In some instances, the identification service 412 can receive a notification from the electronic device 106 and/or the client device 406 that a recharging power source (e.g., a solar accessory 103) has been connected to the electronic device 106.

In box 528, the identification service 412 can receive solar data 435 from the electronic device 106 and or the client device 406. The solar data 435 can include measurements related to the first electrical component 445. The solar data 435 can include measurement signal data, converted values of the measurements, device data 415 associated with the electronic device 106, user identifier data associated with a user of the electronic device 106 and/or the client device 406, and other suitable data.

In box 531, the identification service 412 can determine one or more characteristics of the solar accessory 103 based at least in part on the solar data 435. Some non-limiting of characteristics can include the solar accessory type (e.g., a solar panel type), a solar accessory brand, a model number, a power parameter associated with the solar accessory 103, and other suitable characteristics.

In box 534, the identification service 412 can transmit the one or more characteristics to the electronic device 106 and/or the client device 406. For example, the characteristics can be transmitted to the electronic device 106 for a display via the client application 448. Then, the identification service 412 proceeds to the end.

Figure 6:
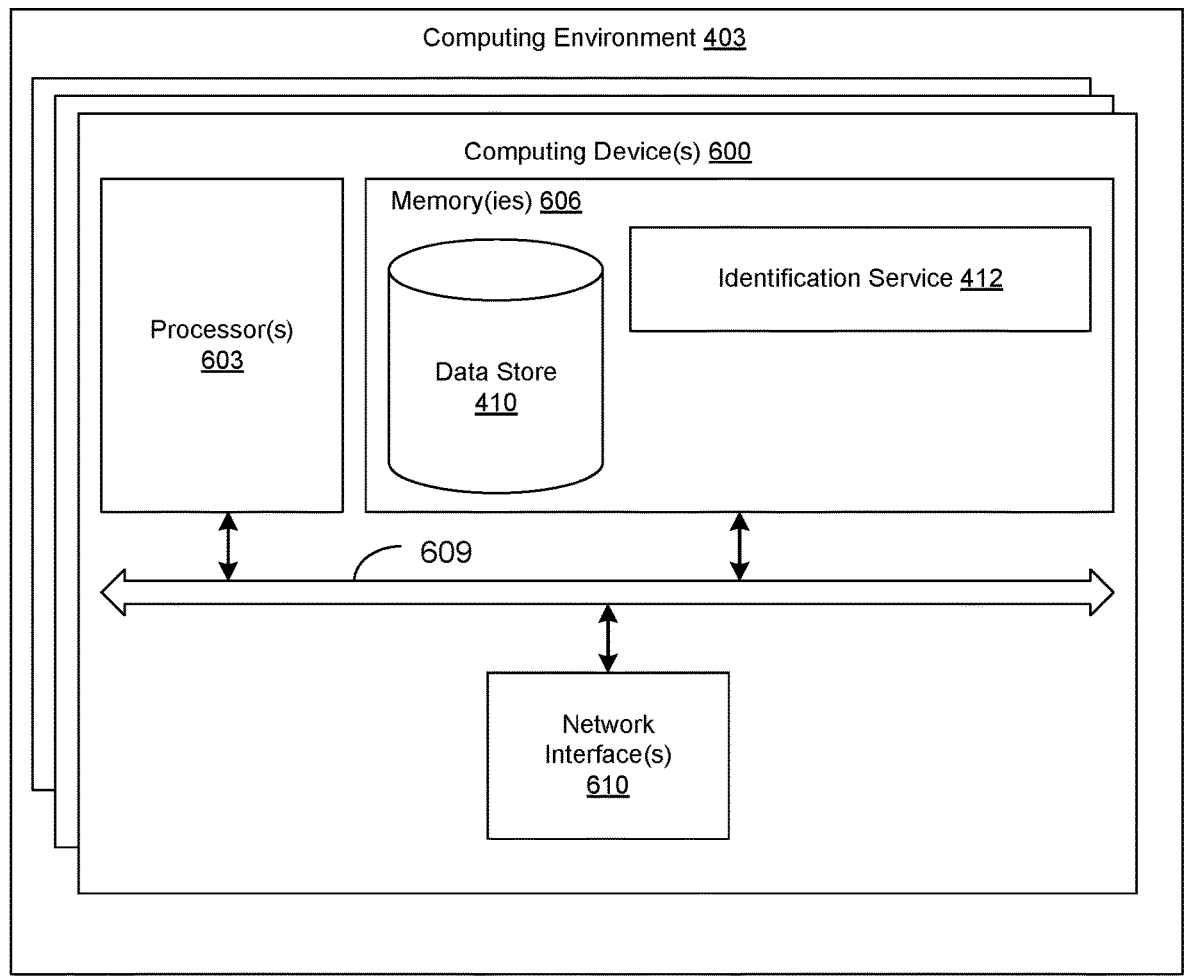
FIG. 6 is a schematic block diagram that provides one example illustration of a computing environment employed in the networked environment of FIG. 4A according to various embodiments of the present disclosure.

With reference to FIG. 6, shown is a schematic block diagram of the computing environment 403 according to an embodiment of the present disclosure. The computing environment 403 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the identification service 412 and the controller application 433, and potentially other applications. Also stored in the memory 606 may be a data store 409 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the controller application 433 and the identification service 412, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5A and 5B show the functionality and operation of an implementation of portions of the controller application 433 and the identification service 412. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 5A and 5B show a specific order of execution, it is understood that the order of execution may differ from that which is depicted. For example, the order of execution of two or more blocks may be scrambled relative to the order shown. Also, two or more blocks shown in succession in FIGS. 5A and 5B may be executed concurrently or with partial concurrence. Further, in some embodiments, one or more of the blocks shown in FIGS. 5A and 5B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the controller application 433 and the identification service 412, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the controller application 433 and the identification service 412, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 403. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A solar panel device, comprising:
   a photovoltaic cell coupled to an electrical cord; and
   the electrical cord comprising a connector head, the connector head including:
      a first electrical connector coupled to a voltage supply line of the solar panel device,
      a second electrical connector coupled to a ground line and a first resistor of the solar panel device, and
      a third electrical connector coupled to the ground line across the first resistor of the solar panel device.

2. The solar panel device of claim 1, wherein the first electrical connector, second electrical connector, and third electrical connector are arranged on the connector head such that:
   a first two of the connectors are aligned with one another with respect to a first axis and a second axis orthogonal to the first axis, and
   a third of the connectors is:
      not aligned with the first two with respect to the first axis, and
      not aligned with the first two with respect to the second axis.

3. The solar panel device of claim 1, wherein the first electrical connector, second electrical connector, and third electrical connector are arranged on the connector head such that, when the connector head is oriented in a first orientation,
   a first two of the connectors are:
      spaced apart from one another horizontally,
      aligned with one another with respect to vertical positioning,
      aligned with one another with respect to depthwise positioning, and
   a third of the connectors is:
      not aligned with the first two with respect to vertical positioning,
      not aligned with the first two with respect to depthwise positioning, and
      disposed horizontally between the first two of the connectors.

4. The solar panel device of claim 1, wherein the first electrical connector, second electrical connector, and third electrical connector are fork connectors.

5. The solar panel device of claim 1, wherein the electrical cord is removably connected to a housing of the solar panel device.

6. The solar panel device of claim 1, wherein the first electrical connector is secured to a connector portion of an electronic device using a screw.

7. The solar panel device of claim 1, wherein the connector head comprises a contoured surface.

8. The solar panel device of claim 1, wherein the connector head comprises a multi-tier contoured surface.

9. The solar panel device of claim 1, wherein voltage across the first resistor of the solar panel device corresponds to one or more characteristics of the solar panel device.

10. The solar panel device of claim 1, wherein the first resistor is included within the connector head.

11. An electrical cord comprising:
   a connector head including:
      a first electrical fork connector including a first set of tines,
      a second electrical fork connector including a second set of tines aligned on a plane with the first set of tines, the second electrical fork connector aligned with the first electrical fork connector with respect to a first axis, and a second axis orthogonal to the first axis, and
      a third electrical fork connector that is:
         not aligned with the first electrical fork connector with respect to the first axis,
         not aligned with the second electrical fork connector with respect to the first axis,
         not aligned with the first electrical fork connector with respect to the second axis, and
         not aligned with the second electrical fork connector with respect to the second axis.

12. The electrical cord of claim 11, wherein the first electrical fork connector, second electrical fork connector, and third electrical fork connector are arranged on the connector head such that, when the connector head is oriented in a first orientation, the first electrical fork connector and second fork connector are:

spaced apart from one another horizontally, aligned with one another with respect to vertical positioning, and aligned with one another with respect to depthwise positioning, and the third electrical fork connector is:

not aligned with the first electrical fork connector with respect to vertical positioning, not aligned with the second electrical fork connector with respect to vertical positioning, not aligned with the first electrical fork connector with respect to depthwise positioning, and not aligned with the second electrical fork connector with respect to depthwise positioning.

13. The electrical cord of claim 12, wherein the first electrical fork connector, second electrical fork connector, and third electrical fork connector are arranged on the connector head such that, when the connector head is oriented in the first orientation, the third electrical fork connector is disposed horizontally between the first electrical fork connector and the second electrical fork connector.

\* \* \* \* \*